Oct. 28, 1941.  T. F. VEGHTE  2,260,548
ORCHARD HEATER
Filed Oct. 18, 1937
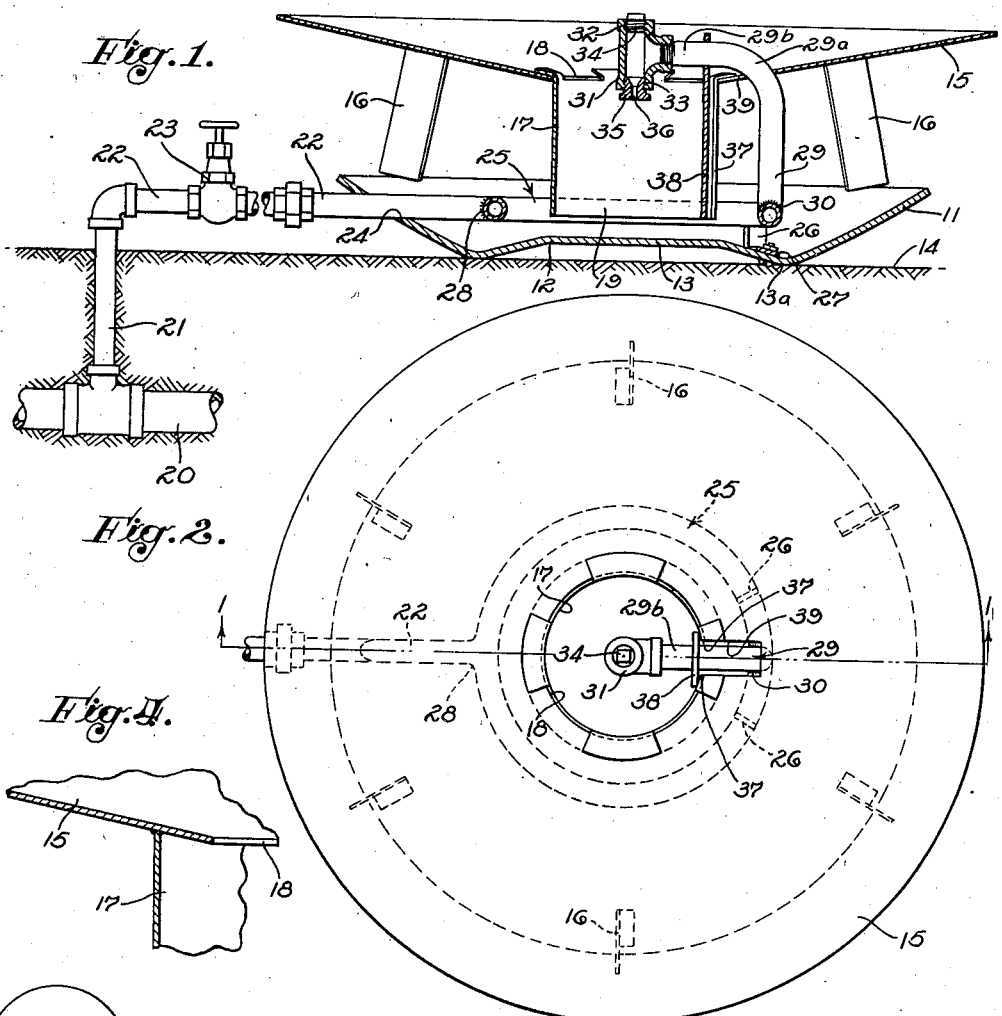
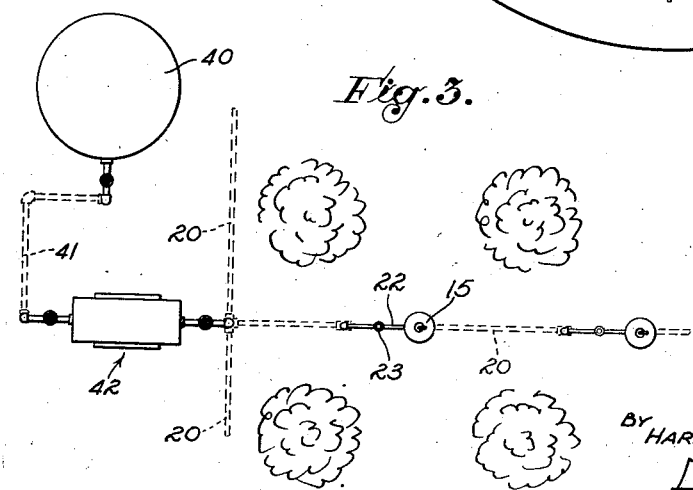
INVENTOR
THEODORE F. VEGHTE
BY HARRIS, KIECH, FOSTER & HARRIS
ATTORNEYS.

Patented Oct. 28, 1941

2,260,548

UNITED STATES PATENT OFFICE 2,260,548

ORCHARD HEATER

Theodore F. Veghte, Van Nuys, Calif.

Application October 18, 1937, Serial No. 169,573

13 Claims. (Cl. 158—66)

This invention relates to heaters, and particularly to heaters which burn a gaseous fuel either supplied in that form or generated in the heater itself from liquid fuel, and which are used for heating the atmosphere in areas devoted to the culture of orchard trees or other agricultural crops which are damaged by low temperatures. At one time it was believed that such heaters to be effective must produce great quantities of smoke which when formed into clouds above the trees prevented radiation of heat from the surface of the earth and thereby maintained during the night sufficiently high temperatures to protect the trees from frost. It is now known that this theory is erroneous. The protective effect of heaters is gained by the actual warming of the air near the ground above the low temperatures which would otherwise exist due to ground radiation and the influx of heavy cold air from neighboring areas. The air at upper levels is not so much affected by this ground radiation and cold air influx and is naturally maintained at a safe temperature. When the cold ground air is heated artificially by fuel burning heaters, it rises until it meets the "ceiling" of this naturally warmer upper air, and is held by this ceiling from rising to higher levels and confined near the ground and about the trees. The discovery of these scientific facts underlying the practical art of orchard heating has led to efforts to product a heater which would completely burn the hydrocarbons of the fuel used, for such a heater not only produces the maximum of heat per unit of fuel consumed, but also, since it gives off no unburned carbon, is smokeless and can be used without causing damage to the upholstery and textile furnishings in houses of the neighborhood, or causing any other inconvenience or harm from contamination of the atmosphere.

It is the object of my invention to provide such a heater which will completely burn the fuel and thereby release a maximum quantity of heat units per unit of fuel, and which will create no troublesome smoke.

It is a further object of my invention to provide a heater which is so designed that it will by the process of combustion create air currents such that the cold air below the atmospheric ceiling will be stirred and blended with the hot air from the heater until the whole layer of air between the ground and the ceiling is evenly warmed. It is a well known fact that if a concentrated column of highly heated air is projected directly upward from a heater on a cold night, it will, due to its relatively lesser density, pierce the ceiling of air of the higher levels and be lost in the upper atmosphere, since the air above the ceiling while lighter than the ground air is heavier than the highly heated air as it comes fresh from the heater. It is therefore an essential quality of an effective and efficient heater that it warm progressively and uniformly the entire mass of ground air so that no part of the mass has a much greater temperature than any other part. My heater causes a circulation of air which accomplishes this result.

It is a further object of my invention to provide a heater which shall be readily available when needed, easy and simple to start into action and to operate, will be inexpensive to manufacture, and will require a minimum of repairs.

One object of my invention is to accomplish a high degree of gasification of liquid fuel by the use of a novel and highly efficient type of generator, which is built into and made a part of the heater.

It is also an object of this invention to provide means for completely separating the flow of cool oxygen-bearing air to the heater from the flow of hot combustion gas away from the heater. Such a separation insures ample oxygen for complete combustion and reduces the temperature of the heater parts, thereby minimizing oxidation and "burning out" of the iron and steel of which the heater is constructed.

Other objects and advantages of my invention will be apparent from the following description of one embodiment thereof and from the drawing, in which:

Fig. 1 is a side elevation, partly in cross section, taken along the line 1—1 of Fig. 2.

Fig. 2 is a top plan view.

Fig. 3 is a plan view of a part of an orchard equipped with heaters embodying my invention.

Fig. 4 is a fragmentary view of the upper portion of the heater, showing a modified construction.

In the drawing, a base of the burner is in the form of a circular plate 11 which rests upon the ground 14. The plate 11 is preferably upwardly concave with its central portion generally depressed below its circular rim and is so shown in the drawing. The plate 11 may be further provided with an elevated center 13, as shown in Fig. 1. The plate 11 may be cast in a mold or may be made of sheet metal which is pressed to shape by a suitable die. The plate 11, instead of resting on the ground, may be supported by a plurality of legs or in any other suitable manner. The outer circumference 13a of the elevated center provides an annular ground-contacting support for the plate 11.

A sheet metal circular separator plate or hood 15 is supported by legs 16 which are rigidly secured to the plate 15 by welding or other suitable means. These legs rest loosely upon the plate 11, preferably at or near its outer rim. This construction makes it possible to readily remove the separator plate from the plate 11 and to as readily replace it in its proper position in which it is centered with respect to the plate 11. This separator plate may be horizontal, or, as shown in the drawing, may take the form of an inverted cone of shallow depth, or it may be upwardly concave, like the plate 11. While not essential to the invention, its outer rim is preferably somewhat higher than its central portion.

The separator plate 15 is formed with a central aperture 18. A vertical draft pipe 17, open at each end and of the same diameter as the aperture 18, is welded or otherwise solidly secured at its upper end to the separator plate, in such position that the pipe opening registers with the aperture 18. Or the aperture 18 may be of smaller diameter than the pipe 17, as shown in Fig. 4, in which case the upper end of the pipe 17 is secured to the under face of the plate 15 at a circular junction line disposed outside the circumference of the aperture 18. The length of pipe 17 is such that its lower end 19 is approximately in the horizontal plane of the outer portions of the plate 11, and is a short distance above that inner portion 12 of this plate which is directly beneath the pipe walls.

Liquid fuel is brought to the heater through an underground pipe 20, an upright pipe 21, and an above-ground horizontal pipe section 22 in which is connected a valve 23 for controlling the flow of fuel to the heater. The pipe 22 passes through an aperture 24 in the plate 11 and is thus supported by the base. I provide a generator 25 which is an endless pipe in the shape of a ring or annulus. This generator is mounted approximately in the horizontal plane of the lower end of the draft pipe 17 and surrounds and is concentric with it. The portion of the generator 25 opposite the pipe 22 is welded to the upwardly extending legs 26 of a U-shaped standard 27, which is in turn bolted to the plate 11. Fuel is conducted to the generator 25 through the pipe 22, the end of which is welded to the generator at a point 28 of its annular length in a manner such that the interior of the pipe 22 communicates with the interior chamber of the generator.

The liquid fuel, when the heater is in operation, is converted into a gas in the generator 25, and the gas thus formed is conducted through a vertical pipe section 29 communicating with and welded to the generator 25 at a point 30 diametrically opposite the point 28. The upper portion 29a of the pipe 29 is curved inwardly to form a 90° arc. Its horizontally disposed upper end 29b threadedly engages and supports a T fitting 31, which is provided with an upper threaded opening 32 and a lower threaded opening 33. The T 31 is disposed in or near the vertical axis of the draft pipe 17, and preferably approximately in the horizontal plane of the upper end of the draft pipe 17. The upper opening 32 of the T 31 is fitted with a plug 34, and the lower opening 33 is fitted with a burner tip or nozzle 35. This nozzle 35 has a central, downwardly directed orifice 36 from which, when the heater is in operation, the generated gas issues under pressure.

The draft pipe 17 is formed with a vertical slot 37 extending from the plate 15 to the lower end of the pipe 17, to facilitate assembly of the upper and lower parts of the heater. The separator plate 15 is formed with a cut-away notch 39 registering with the slot 37. The upper part of the heater comprises the rigidly assembled plate 15, legs 16, and draft pipe 17. The lower part of the heater comprises the rigidly assembled plate 11, generator 25, the inlet and outlet generator pipes 22 and 29, and the fitting 31 and associated parts. The slot 37 and notch 39 make it possible to lower the upper part of the heater into operative position on the lower part, the upper arc-shaped portion 29a of the pipe 29 being received by the notch 39 and slot 37 as the upper part is lowered into position. To close this slot 37 and prevent the admixture of air within the pipe 17 and the air and gases without the pipe, I provide an apron 38 which is secured to and depends from the upper end portion 29b of the pipe 29, with its lower end approximately in the horizontal plane of the lower end of the draft pipe 17.

In order to secure the best results from heaters of my invention, they are scattered through the orchard, the number of trees to each heater depending upon conditions. In Fig. 3 I have shown an illustrative installation in which each heater is placed centrally of four trees. The heaters are supplied with fuel from a network 20 of underground pipes. The fuel is stored in a tank 40 from which the liquid fuel flows by gravity or otherwise through piping 41 to a pump and pressure tank 42, from which it is forced under pressure through the network of underground pipes to the several heaters.

When, because of temperature conditions in the orchard, it is desired to put the heaters in operation, a small amount of priming fuel is placed on the plate 11 and at once ignited. This is done by a starting torch such as is commonly used for this purpose in firing orchard heaters. The valve 23 is then opened the desired amount. Practice in operating the heaters acquaints the operator with the extent of opening required for the production of varying amounts of heat, in accordance with varying atmospheric temperatures and conditions. The generator 25, which has been heated by the priming fuel burning in the plate 11, converts into a gas the liquid fuel flowing to and through it. This gas is blown, by its pressure of generation, from the orifice 36 downwardly against the plate 11, and is initially ignited by flames from the burner priming fuel on the plate 11.

After initial ignition, the jet of gas issuing from the orifice 36 continues to burn. The jet of burning gas is deflected upwardly and radially outwardly by the plate 11, which, because of its position in the path of the burning gas, becomes highly heated. Since, both because of its high temperature and its deflecting action upon the jet of burning gas, it aids the combustion process, it may be termed a "combustion plate". The nozzle 35, being a burner nozzle, may be termed a "fuel combustion device".

I have found that the form of generator invented and used by me in my heater is very efficient in bringing about complete gasification of the liquid fuel. The generator has a double path for the fuel between the inlet 28 and the outlet 30. The fuel divides at the inlet, one stream passing around one side of the generator and the other stream passing around the other side of the generator. Gasification takes place in each of the two semi-circular sides of the generator. Surges of fuel are set up by the incidental variations in generated pressure in the two generator sides, with the result that any ungasified droplets of fuel are blown back and forth until completely converted to gaseous form, instead of being prematurely carried to the nozzle and discharged therefrom as liquid particles, which are less apt than gas to be completely burned in the heater chamber. Such premature discharge in single-duct generators is a familiar difficulty, and is eliminated by the double-duct generator of my invention. The rapid and complete gasification which is a feature of my double-duct generator has the additional advantage of lessening the deposit of unburned carbon and hydrocarbon compounds upon the generator walls, which in generators of the usual type accumulate in caked layers until the flow of fuel through the generator is undesirably throttled or completely stopped.

When the generated fuel gas issues from the orifice 36 under pressure, it acts as an injector stream to induce the flow of a current of air from above the separator plate 15 down the draft pipe 17. The fuel gas and air move downward together against the plate 11, and during the movement toward and away from this plate the oxygen of the air and the hydrocarbons of the gas are united in combustion. The burned gases are then blown outwardly under the lower end 19 of the draft pipe, and directed substantially horizontally and radially outwardly in every direction, heating the generator in their travel. The levels of air near the ground are heated, and this heated air begins to rise slowly due to its lesser density. Cold air continues to accumulate above the heater and flow through the draft pipe 17 to the combustion area over the plate 11. The separator plate 15 accomplishes several beneficial results. A horizontally extended area of ground air is warmed, instead of a small vertical column of upper air over the heater. A widely diffused slow circulation of air is set up in the atmospheric spaces under the "ceiling." The plate 15 also separates sharply the inflow of cold oxygen-bearing air from the outflow of hot burner gases. This separation prevents a temperature build-up, which would be inevitable should some of the hot gases find their way back into the draft pipe around the outer edges of the separator plate. To insure this separation, I have found that the separator plate must have a diameter not less than four and, preferably, five times that of its central aperture. This separation also insures an adequate supply of oxygen, which would not be the case should the carrying capacity of the draft pipe be partly taken up with non-oxygen-bearing gases of combustion.

I claim as my invention:

1. In an orchard heater adapted to be positioned on the ground in an orchard, the combination of: a substantially horizontal separator plate with a central aperture, said separator plate being mounted to constitute when in assembled operative position the top wall of an annular chamber which is open to the atmosphere lying laterally beyond and to the atmosphere lying above and laterally beyond the outer peripheral edge of said separator plate; a vertical draft pipe depending from said separator plate and communicating through said aperture with the air above said plate; a fuel combustion device adapted to provide a movement of combustion gases adjacent the lower end of said draft pipe; and means cooperable with said separator plate for directing the gases of combustion radially outward through said annular chamber beneath said separator plate to positions beyond the periphery of said plate where said products are free to rise vertically past said plate.

2. In an orchard heater adapted to be positioned on the ground in an orchard, the combination of: a substantially horizontal separator plate with a central aperture, said separator plate being mounted to constitute when in assembled operative position the top wall of an annular chamber which is open to the atmosphere lying laterally beyond and to the atmosphere lying above and laterally beyond the outer peripheral edge of said separator plate; a vertical draft pipe depending from said separator plate and communicating through said aperture with the air above said plate; a source of gaseous fuel; a downwardly directed nozzle connected to said source and disposed within said draft pipe; and a horizontally arranged combustion plate mounted beneath the lower end of said draft pipe and in vertically spaced relationship with the lower end of said draft pipe.

3. In an orchard heater adapted to be positioned on the ground in an orchard, the combination of: a substantially horizontal separator plate with a central aperture of a diameter not greater than one-fourth the diameter of said separator plate, said separator plate being mounted to constitute when in assembled operative position the top wall of an annular chamber which is open to the atmosphere lying laterally beyond and to the atmosphere lying above and laterally beyond the outer peripheral edge of said separator plate; a vertical draft pipe depending from said separator plate and communicating through said aperture with the open air above said plate; a fuel combustion device adapted to provide a movement of combustion gases adjacent the lower end of said draft pipe; and means cooperable with said separator plate for directing the gases of combustion radially outward through said annular chamber beneath said separator plate to positions beyond the periphery of said plate where said products are free to rise vertically past said plate.

4. In an orchard heater adapted to be positioned on the ground in an orchard, the combination of: a substantially horizontal separator plate with a central aperture of a diameter not greater than one-fourth the diameter of said separator plate, said separator plate being mounted to constitute when in assembled operative position the top wall of an annular chamber which is open to the atmosphere lying laterally beyond and to the atmosphere lying above and laterally beyond the outer peripheral edge of said separator plate; a vertical draft pipe depending from said separator plate and communicating through said aperture with the open air above said plate; a source of gaseous fuel; a downwardly directed nozzle connected to said source and disposed centrally with respect to said draft pipe; and a horizontally arranged combustion plate mounted beneath the lower end of said draft pipe and in vertically spaced relationship with the lower end of said draft pipe.

5. In an orchard heater adapted to be positioned on the ground in an orchard, the combination of: a substantially horizontal separator plate with a central aperture, said separator plate being mounted to constitute when in assembled operative position the top wall of an annular chamber which is open to the atmosphere lying laterally beyond and to the atmosphere lying above and laterally beyond the outer peripheral edge of said separator plate; a vertical draft pipe depending from said separator plate and communicating through said aperture with the open air above said plate; a source of liquid fuel; a gasifying generator connected to said source and disposed outside of said draft pipe and adjacent its lower end; a downwardly directed nozzle connected to said generator and disposed centrally with respect to said draft pipe; and a horizontally arranged combustion plate mounted beneath the lower end of said draft pipe and in vertically spaced relationship with the lower end of said draft pipe.

6. In an orchard heater adapted to be positioned on the ground in an orchard, the combination of: a base including a circular combustion plate; standards mounted upon the base; a circular, substantially horizontal separator plate with a central aperture, said separator plate being supported upon said standards above and concentrically with respect to said combustion plate and in removable relationship to said combustion plate, said separator plate being mounted to constitute when in assembled operative position the top wall of an annular chamber which is open to the atmosphere lying laterally beyond and to the atmosphere lying above and laterally beyond the outer peripheral edge of said separator plate; a vertical draft pipe carried by and depending from said separator plate and communicating through said aperture with the open air above said plate and with its lower end spaced above said combustion plate; a source of gaseous fuel; and a downwardly directed nozzle connected to said source and disposed centrally with respect to said draft pipe, said separator plate being in removable relationship with said source and nozzle.

7. In an orchard heater adapted to be positioned on the ground in an orchard, the combination of: a base, including a circular combustion plate supported by said base; standards mounted upon the base; a circular, substantially horizontal separator plate with a central aperture, said separator plate being supported upon said standards above and concentrically with respect to said combustion plate and in removable relationship to said combustion plate, said separator plate being mounted to constitute when in assembled operative position the top wall of an annular chamber which is open to the atmosphere lying laterally beyond and to the atmosphere lying above and laterally beyond the outer peripheral edge of said separator plate; a vertical draft pipe carried by and depending from said separator plate and communicating through said aperture with the open air above said plate and with its lower end spaced above said combustion plate; a source of liquid fuel; a generator mounted above said combustion plate and connected with said source of liquid fuel; and a downwardly directed burner nozzle connected to said generator and disposed centrally with respect to said draft pipe, said separator plate being in removable relationship with said source and nozzle.

8. In an orchard heater adapted to be positioned on the ground in an orchard, the combination of: a base including a circular, horizontally arranged combustion plate; a generator permanently mounted on said base; a downwardly directed burner nozzle permanently mounted on said base and communicating with said generator; a substantially horizontal separator plate with a central aperture, said separator plate being removably mounted in vertically spaced relationship above said combustion plate, said separator plate being mounted to constitute when in assembled operative position the top wall of an annular chamber which is open to the atmosphere lying laterally beyond and to the atmosphere lying above and laterally beyond the outer peripheral edge of said separator plate; and a draft pipe rigidly secured to said separator plate in position to communicate through said aperture with the open air above said separator plate and to surround said nozzle, and having its lower end vertically spaced above said combustion plate, whereby said separator plate is readily removably mounted upon said base.

9. In an orchard heater adapted to be positioned on the ground in an orchard, the combination of: a substantially horizontal separator plate having a central aperture, said separator plate being mounted to constitute when in assembled operative position the top wall of an annular chamber which is open to the atmosphere lying laterally beyond and to the atmosphere lying above and laterally beyond the outer peripheral edge of said separator plate; a vertical draft pipe mounted below said plate and with its axis passing approximately through the center of said aperture; means for supplying gaseous fuel under pressure; and a downwardly directed outlet for said fuel mounted approximately centrally with respect to said draft pipe.

10. In an orchard heater adapted to be positioned on the ground in an orchard, the combination of: a fluid fuel burner; means for conducting air downwardly through said burner with its intake communicating with the atmosphere adjacently above said heater and means for directing the heated products of combustion radially outwardly from the vertically central portions of said heater in substantially all directions into the atmosphere lying laterally beyond the periphery of the heater and in contact with the ground, said directing means serving to prevent direct vertical communicating contact of the atmosphere adjacently above the heater and the heated atmosphere lying between the directing means and the ground, whereby the heater is adapted to draw downward relatively cold air from a relatively low air level, to heat said relatively cold air, and propel it radially outward with respect to the vertically central portions of the heater into diffused relationship with the air immediately adjacent the ground, and whereby the air mixture so formed is free to rise and in turn become diffused with the air at said relatively low air level and air at levels thereabove.

11. In an orchard heater adapted to be positioned on the ground in an orchard, the combination of: a base including a circular, horizontally arranged combustion plate; a generator permanently mounted on said base; conduit means for connecting said generator with a fuel supply means; a downwardly directed burner nozzle permanently mounted on said base; a conduit section connecting said nozzle with said generator; a substantially horizontal separator plate with a central aperture; said separator plate being removably mounted in vertically spaced relationship above said combustion plate, said separator plate being mounted to constitute when in assembled operative position the top wall of an annular chamber which is open to the atmosphere lying laterally beyond and to the atmosphere lying above and laterally beyond the outer peripheral edge of said separator plate; a draft pipe rigidly secured to said separator plate in position to communicate through said aperture with the open air above said separator plate and to surround said nozzle, and having its lower end vertically spaced above said combustion plate, said conduit section extending radially beyond said draft pipe, and said separator plate and draft pipe being slotted in vertical alignment with said conduit section; and an apron depending from said conduit section in position to close the slot in said draft pipe, whereby said separator plate is readily removably mounted upon said base.

12. In an orchard heater adapted to be positioned on the ground in an orchard, the combination of: a source of vaporized fuel, a burner orifice connected to said source, means for guiding air from the atmosphere adjacently above said heater, and which is relatively near the ground, centrally downward to points within the heater, and means for directing the heated products of combustion radially outward from the vertically central portions of said heater in a substantially horizontal direction into the atmosphere lying laterally beyond the periphery of the heater and in contact with the ground, said guiding means serving to prevent direct vertical communicating contact of the atmosphere adjacently above the heater and the heated atmosphere lying between the guiding means and the ground, whereby the heater is adapted to draw downward relatively cold air from a relatively low air level, to heat said relatively cold air, and propel it radially outward with respect to the vertically central portions of the heater into diffused relationship with the air immediately adjacent the ground, and whereby the air mixture so formed is free to rise and in turn become diffused with the air at said relatively low air level and air at levels thereabove.

13. In an orchard heater adapted to be positioned on the ground in an orchard, the combination of: a substantially horizontal separator plate having a central aperture; means for mounting said plate above the ground to provide a chamber beneath the plate open to the atmosphere lying laterally beyond and to the atmosphere lying above and laterally beyond the outer peripheral edges of said plate; means comprising a gaseous fuel supply means and burner orifice therefor for drawing air downwardly through said aperture into said chamber; and means in said chamber disposed to receive said air and burned fuel from said orifice and deflect them horizontally outward in all directions in said chamber, said means for drawing the air downward being constructed to apply a velocity head thereto sufficient to cause it to travel substantially beyond the peripheral edges of said plate, where it is free to rise vertically past said plate.

THEODORE F. VEGHTE.